Sept. 16, 1958  M. G. LEVKOFF  2,851,843
LAWN MOWERS
Filed Oct. 27, 1955
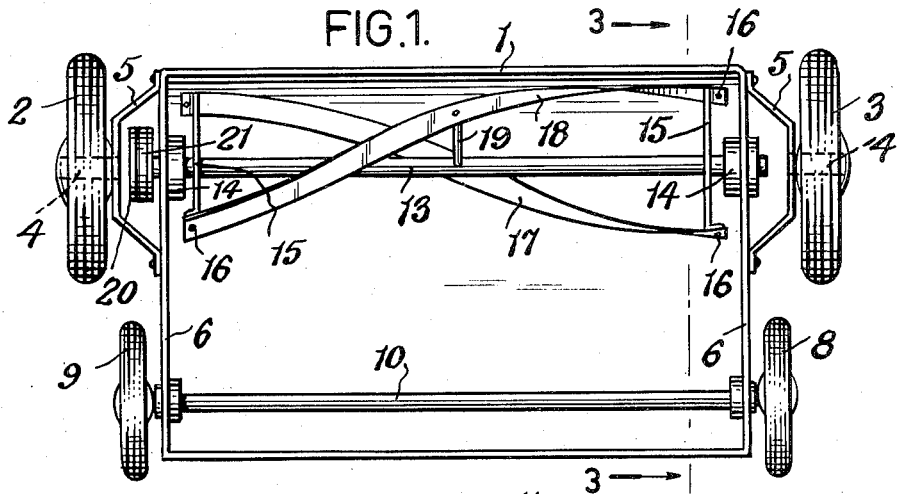
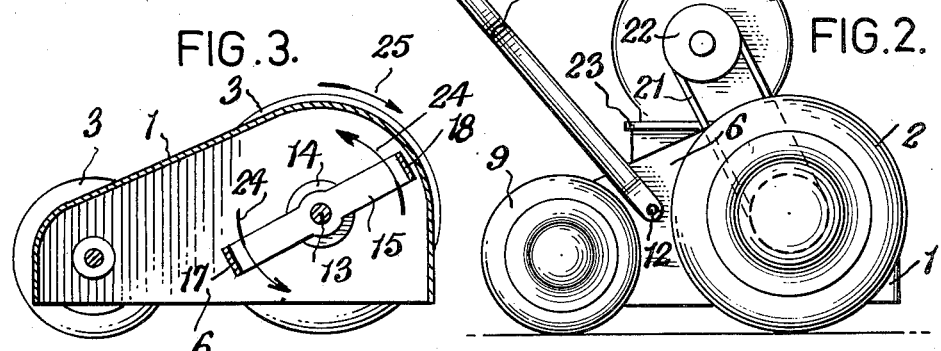
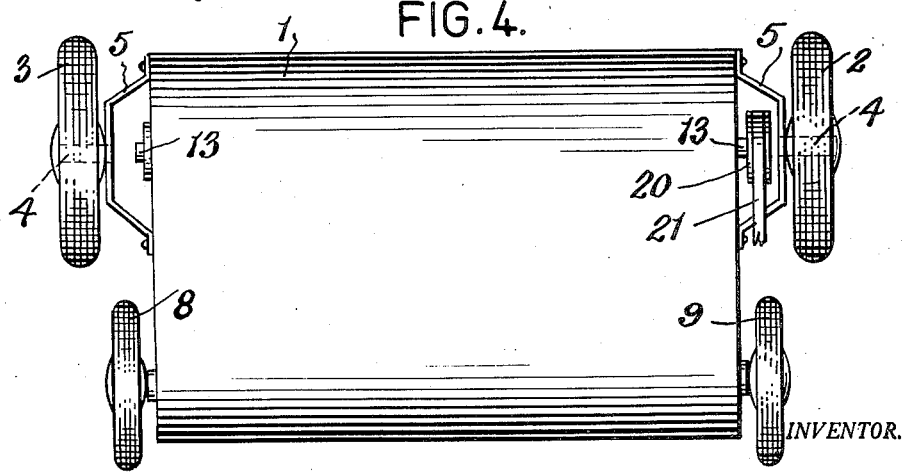
INVENTOR.
Milton G. Levkoff
by Fritz zuejla
Atty.

United States Patent Office 2,851,843
Patented Sept. 16, 1958

2,851,843

LAWN MOWERS

Milton G. Levkoff, Columbia, S. C.

Application October 27, 1955, Serial No. 543,203

1 Claim. (Cl. 56—26)

This invention relates to lawn mowers, and more particularly to those of the power-driven type, and it is an object of the invention to provide a lawn mower of this character which will be of simple, rugged construction enabling it to be used efficiently and safely.

In most lawn mowers, in which the blades rotate on a horizontal axis, the cutting blades are driven in a direction similar to that in which the supporting wheels are rotated during the forward propelling movement of the mower. As a result, the grass cuttings, twigs, and often dislodged stones, are cast rearwardly by the blades toward the operator, sometimes resulting in accidents.

I have found that improved cutting results are obtained by providing cutting blades, rotating about a horizontal axis, which rotate in a direction opposite to the direction of rotation of the supporting wheels when the mower is being moved forwardly. This tends to direct twigs, grass cuttings and stones forwardly of the mower, thus avoiding the possibility of the operator being struck by such objects. It is therefore one of the objects of the invention, to provide a mower in which the cutting blades, revolving about a horizontal axis, will be rotated in a direction opposite to the direction of movement of the propelling wheels.

It is another object of the invention to provide a lawn mower in which the forward propelling wheels will be rotatively mounted on an axis which is co-axial to the cutting blades, thus maintaining the blades in a definite spaced relationship to the wheels, whereby the possibility of the blades gouging or digging into the surface of a lawn will be prevented.

It is another object of the invention to provide a lawn mower in which the cutting blades operate with a sweeping cutting action as distinguished from the shearing or scissoring effect obtained when it is necessary for the cutting blades to co-operate with a fixed cutting bar.

With these and other objects to be hereinafter set forth in view, I have devised the arrangement of parts to be described and more particularly pointed out in the claims appended hereto.

In the accompanying drawing, wherein an illustrative embodiment of the invention is disclosed, Fig. 1 is a view looking at the bottom of a lawn mower constructed in accordance with the invention;

Fig. 2 is a side elevational view of the same;

Fig. 3 is a sectional view, taken substantially on the line 3—3 of Fig. 1, looking in the direction of the arrows, and Fig. 4 is a stop plan view of the mower, with the motor and some other parts omitted to more clearly disclose construction.

Referring to the drawing, 1 generally indicates the housing or casing of the lawn mower, the same being preferably composed of sheet metal and suitably reinforced as required for strength. The supporting wheels for the mower include the larger front wheels indicated respectively at 2 and 3, and each of these wheels is rotatively mounted on a stub axle 4 extending from a bracket 5 securely attached to a side wall 6 of the housing 1. These wheels 2 and 3 are thus free to rotate as the lawn mower is pushed over the lawn to be mowed. If desired, the wheels 2 and 3 can be motor-driven from the motor 7 in any of the known ways.

The rear supporting wheels for the mower are respectively shown at 8 and 9, and these wheels are rotative on the axle 10 which extends across the under side of the housing from one side wall 6 to the other and is mounted in the said opposite side walls.

The rear supporting wheels 8 and 9 are also freely rotative, and the mower is thus supported on a four-wheeled support and on which it is pushed, or if desired propelled, by the motor 7 over the surface of the ground. A yoke-shaped handle 11, shown in Fig. 2, but omitted from the other views of the drawing, is used to propel and guide the mower in the known manner. This handle 11 has its ends pivotally attached to the side walls 6 of the housing, as indicated at 12 in Fig. 2.

The cutter-blade carrying shaft is shown at 13, and the same extends across the housing 1 from one of the side walls 6 to the other, and is rotatively mounted in bearings 14 mounted in or on said side walls. Adjacent to its opposite ends, the cutter blade shaft 13 is provided with radially-projecting arms 15 having their opposite ends secured by the bolts or rivets 16 to spiral or twisted cutting blades indicated respectively at 17 and 18. These blades may be centrally or additionally reinforced and stiffened by being connected by a brace member 19 which may also be attached to the shaft 13. The arrangement disclosed is such that when each of the blades reaches the bottom of its rotative movement, and is closest to the ground, it presents a flat surface adjacent to and substantially parallel to the ground. It thus operates with a scythe-like action and without the use of a fixed co-operating cutter bar, to slice off the grass.

It is also to be noted that the axis of the blade-carrying shaft 13 is co-axial with the axis of the wheels 2 and 3. Hence, this arranges the cutting blades at a definite distance from the peripheries of the wheels 3, and as a result, when the mower traverses over rolling or uneven ground, the distance between the blades and the ground is maintained and the blades therefore will not dig into and mar the turf.

The shaft 13 is extended beyond one of the walls 6 and this extended portion of the shaft carries a pulley 20 over which a belt 21 extends, said belt extending toward and passing over a drive pulley 22 which can be located on the shaft of the motor 7 or otherwise driven thereby. The motor 7 may be of the gasoline or electric type and may be suitably mounted, as by a platform or other support 23, on top of the housing 1. As previously stated, the motor 7 may also be employed to propel the wheels 2 and 3 if desired. As will be understood, a clutch of known type may, if desired, be used to interrupt the drive of the blades when desired.

It will be noted that the motor is caused to operate in a manner to rotate the blade-carrying shaft 13 in a direction opposite to that in which the several supporting wheels, 2, 3, 8 and 9 are rotated when the mower is moved forwardly. In Fig. 3, the direction of rotation of the shaft 13 is indicated by the arrows 24, while the direction of rotation of the wheels 2 and 3, as well as the wheels 8 and 9, is indicated by the arrows 25. It will therefore be noted that the counter-clockwise rotative movement of the blade-carrying shaft 13 is such as to cause the cuttings or clippings to be urged forwardly during the cutting operation, rather than be urged toward the rear of the cutter and toward the operator who is positioned behind the mower and is engaged in guiding the same with the handle 11. This results in the clippings, twigs, and dislodged stones being ejected away from the operator rather than toward him so that the possibility of the operator being struck by dislodged objects during the mowing operation will be prevented.

The improved mower has been found effective in operation and since the blades slice off the grass with a scythe-like operation in which no fixed co-operating cutter bar is used, the clogging which often occurs, especially when cutting damp or wet grass, is avoided.

Having thus described a single embodiment of the invention, it is obvious that the same is not to be restricted thereto, but is broad enough to cover all structures coming within the scope of the annexed claim.

What I claim is:

In a lawn mower, a housing, an axle mounted therein and carrying a pair of freely-rotatable supporting wheels, brackets at opposite sides of the housing carrying stub axles carrying freely rotative wheels, a cutter-blade shaft rotative in the housing and axially aligned with the stub axles, a motor mounted on the housing for rotating the shaft in a direction opposite to the direction of rotation of the wheels when said wheels are moving the mower forwardly, and blades carried by the shaft and operative within the housing, the wheels being freely operable independently of the cutter blade shaft, the motor being operative to drive only the cutter blade shaft.

References Cited in the file of this patent

UNITED STATES PATENTS

| | | |
|---|---|---|
| 1,806,584 | Borer | May 26, 1931 |
| 2,059,731 | Haager | Mar. 3, 1936 |
| 2,501,925 | Yensen et al. | Mar. 28, 1950 |
| 2,532,105 | King | Nov. 28, 1950 |